US010454821B2

(12) United States Patent
Filsfils et al.

(10) Patent No.: US 10,454,821 B2
(45) Date of Patent: Oct. 22, 2019

(54) CREATING AND MAINTAINING SEGMENT ROUTED TRAFFIC ENGINEERING POLICIES VIA BORDER GATEWAY PROTOCOL

(71) Applicant: CISCO TECHNOLOGY, INC., San Jose, CA (US)

(72) Inventors: Clarence Filsfils, Brussels (BE); Arjun Sreekantiah, San Jose, CA (US); Stefano B. Previdi, Rome (IT); Muthurajah Sivabalan, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 15/419,819

(22) Filed: Jan. 30, 2017

(65) Prior Publication Data
US 2018/0109450 A1    Apr. 19, 2018

Related U.S. Application Data

(60) Provisional application No. 62/408,422, filed on Oct. 14, 2016.

(51) Int. Cl.
*H04L 12/58* (2006.01)
*H04L 12/741* (2013.01)
*H04L 12/715* (2013.01)
*H04L 12/803* (2013.01)

(52) U.S. Cl.
CPC .............. *H04L 45/74* (2013.01); *H04L 45/04* (2013.01); *H04L 47/125* (2013.01)

(58) Field of Classification Search
None
See application file for complete search history.

(56) References Cited

U.S. PATENT DOCUMENTS

2008/0130515 A1*    6/2008    Vasseur ............... H04L 12/4633
                                                          370/254

OTHER PUBLICATIONS

Previdi, S., et al., "Advertising Segment Routing Traffic Engineering Policies in BGP," Network Working Group, May 27, 2016, 28 pages; https://tools.ietf.org/pdf/draft-previdi-idr-segment-routing-te-policy-01.pdf.
Previdi, S., et al., "IPv6 Segment Routing Header (SRH)," Network Working Group, Sep. 20, 2016, 29 pages; https://tools.ietf.org/pdf/draft-ietf-6man-segment-routing-header-02.pdf.
Filsfils, C., et al., "Segment Routing Architecture," Network Working Group, Jul. 4, 2016, 29pages; https://tools.ietf.org/pdf/draft-ietf-spring-segment-routing-09.pdf.
Filsfils, C., et al., "Segment with MPLS data plane," Network Working Group, Jul. 6, 2016, 15pages; https://tools.ietf.org/pdf/draft-ietf-spring-segment-routing-mpls-05.pdf.
Rosen, E., et al., "The BGP Tunnel Encapsulation Attribute," IDR Working Group, Nov. 21, 2016, 40pages; https://tools.ietf.org/pdf/draft-ietf-idr-tunnel-encaps-02.pdf.

(Continued)

*Primary Examiner* — Zewdu A Beyen

(57) ABSTRACT

Embodiments of the present disclosure provide a set of extensions to enable BGP to setup and maintain flexible Segment Routed Traffic Engineered (SR-TE) policies. Embodiments of the present disclosure further propose a new approach for steering traffic onto SR-TE paths on a per-prefix basis without deploying the existing complex mechanisms.

20 Claims, 6 Drawing Sheets

(56) References Cited

OTHER PUBLICATIONS

Sivabalan, S., et al., "Carrying Binding Label/Segment-ID in PCE-based Networks," PCE Working Group, Apr. 23, 2015, 9pages; https://tools.ietf.org/pdf/draft-sivabalan-pce-binding-label-sid-00.pdf.

Sreekantiah, A., et al., "Segment Routing Traffic Engineering Policy using BGP," Network Working Group, Oct. 16, 2015, 13pages; https://tools.ietf.org/pdf/draft-sreekantiah-idr-segment-routing-te-00.pdf.

Previdi, S., et al., "Advertising Segment Routing Traffic Engineering Policies in BGP," Network Working Group, Mar. 18, 2016, 18pages; https://tools.ietf.org/pdf/draft-previdi-idr-segment-routing-te-policy-00.pdf.

A. Abouchaev, et al., "Brain-Slug: a BGP-Only SDN for Large-Scale Data-Centers", https://docplayer.net/3418865-Brain-slug-a-bgp-only-sdn-for-large-scale-data-centers.html, downloaded form the Internet on May 28, 2019, 29 pages.

Sally Johnson, "Border Gateway Protocol as a hybrid Sdn protocol", https://searchnetworking.techtargetcom/feature/Border-Gateway-Protocol-as-a-hybrid-SDN-protocol, downloaded from the Internet on May 23, 2019, 6 pages.

P. Lapukhov, et al., "Centralized Routing Control in BGP Networks Using Link-State Abstraction", draft-lapukhov-bgp-sdn-00, Network Working Group, Internet-Draft, Sep. 2, 2013, 27 pages.

\* cited by examiner

CREATING AND MAINTAINING SEGMENT ROUTED TRAFFIC ENGINEERING POLICIES VIA BORDER GATEWAY PROTOCOL

CLAIM OF PRIORITY APPLICATION

This application claims the benefit of priority under 35 U.S.C. § 119(e) to U.S. Provisional Application Ser. No. 62/408,422, entitled "CREATING AND MAINTAINING SEGMENT ROUTED TRAFFIC ENGINEERING POLICIES VIA BORDER GATEWAY PROTOCOL," filed Oct. 14, 2016, the disclosure of which is considered part of and is incorporated herein by reference in its entirety.

TECHNICAL FIELD

This disclosure relates in general to the field of computer networking and, more particularly, to techniques for creating and maintaining segment routed traffic engineering (SR-TE) policies, for example in, but not limited to, data center deployments.

BACKGROUND

Complex network environments are increasingly used by enterprises for effective collaboration and interaction and to e.g. store data and resources. A typical network environment contains myriad network nodes, including hosts, load balancers, routers, switches, etc. Such a network environment connecting the network nodes can provides secure user access to various services and an infrastructure for deployment, interconnection, and aggregation of shared resources as required, including applications, hosts, appliances, and storage. Improving operational efficiency and optimizing utilization of resources in such network environments are some of the challenges facing their managers. One such challenge arises from a fact that, often times, in a typical network environment such as e.g. in data center networks or in service provider networks, various resources (e.g. applications) have varying characteristics in terms of bandwidth, latency, fault tolerance, and, in some cases, legal requirements. Because of this, at times, strict guidelines require various traffic flows to take different forwarding paths within a given network environment, i.e. some data traffic may have to be forwarded via a set of specific network nodes within a network environment. While, theoretically, this can be achieved using a completely isolated set of hardware for so-called "forwarding planes" and/or tweaking routing protocol metrics to achieve it, it is a very costly, complex and cumbersome process.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
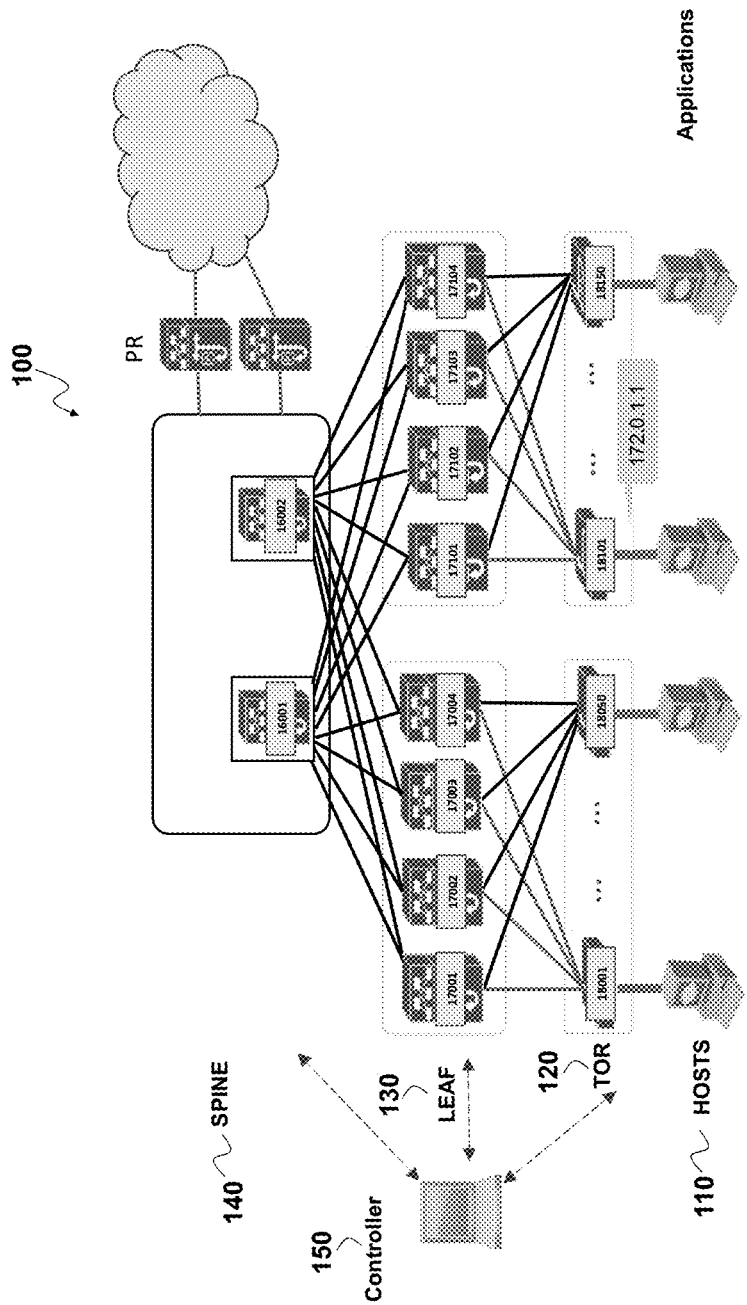
FIG. 1 is a simplified block diagram illustrating a data center network in a network environment, according to some embodiments of the present disclosure.

Segment Routing ("SR") refers to one of the packet forwarding mechanisms used e.g. in Dynamic Fabric Automation ("DFA"), also referred to as "Vinci," an architecture for facilitating data center ("DC") networking. With SR, a network node steers a packet through an ordered list of instructions, called segments. A segment can represent any instruction, topological or service-based. A segment can have a local semantic to an SR node or global within an SR domain. SR allows to enforce a flow through any path and service chain while maintaining per-flow state only at the ingress node of the SR domain. Segment Routing can be directly applied to a Multi-Protocol Label Switching (MPLS) architecture with no change on the forwarding plane. A segment may be encoded as an MPLS label. An ordered list of segments is encoded as a stack of labels. The active segment is on the top of the stack. A completed segment is popped off the stack. The addition of a segment is performed with a push. More details regarding SR architecture are provided in the Internet-Draft "I-D.ietf-spring-segment-routing" of the Internet Engineering Task Force (IETF). More details regarding instantiation of SR on the MPLS data place are provided in the Internet-Draft "I-D.i-etf-spring-segment-routing-mpls" and SR instantiation over the IPv6 data plane is described in the Internet-Draft "I-D.i-etf-6man-segment-routing-header."

Segment Routing enables MPLS-based DC operators to provide differentiated end user experience via different levels of Service Level Assurance (SLA). This, in turn, requires some kind of Traffic Engineering ("TE") in DC networks, where, in general, TE refers to managing the flows of traffic, typically data plane traffic (i.e. actual data exchanged instead of control data for configuring various network nodes) in networks.

Border Gateway Protocol ("BGP") is becoming a popular routing protocol of choice among major operators and service providers. Inventors of the present disclosure realized that an ability to set up Segment Routed Traffic Engineered (SR-TE) traffic flow paths using BGP would simplify network operation without introducing yet another protocol for this purpose. Such capability is also useful for other use cases employing BGP, such as e.g. Autonomic Carrier Ethernet (ACE).

Embodiments of the present disclosure provide a set of extensions to enable BGP to set up and maintain flexible SR-TE policies. Embodiments of the present disclosure further propose a new approach for steering traffic onto SR-TE paths on a per-prefix basis without deploying existing complex mechanisms (such as using a dedicated loopback address per SR-TE path, recursive forwarding lookup, etc.).

Various embodiments disclosed herein provide the ability to carry TE policy as well as at least one segment list of a SR-TE path over BGP session established using a new BGP Subsequent Address Family Identifier (SAFI), as well as the ability to provide per-prefix SR-TE path with equal or unequal cost multi-path load-sharing and other TE policies without the need to use existing inefficient/expensive methods (such as one loopback per TE path, recursive route lookup, etc).

Since embodiments of the methods described herein involve processing of BGP update messages and forwarding of traffic according to processed BGP messages, when assisting in creating and maintaining SR-TR policies, a functional entity performing embodiments of these methods will be referred to in the following as an "BGP SR-TE processing system" (where the word "system" does not imply or limit its implementation to a system). Such a functional entity could be implemented within any network element or distributed among a plurality of network elements associated with autonomous systems, e.g. in BGP speakers of edge routers. For example, a part of the BGP SR-TE processing system responsible for preparing BGP update messages for sending may (but does not have to) be implemented separately from a part of the BGP SR-TE processing system responsible for processing received BGP update messages. The former part of the BGP SR-TE processing system may be referred to as a "sending BGP SR-TE processing system", while the latter part of the BGP SR-TE processing system may be referred to as a "receiving BGP SR-TE processing system."

As will be appreciated by one skilled in the art, aspects of the present disclosure, in particular the functionality of the BGP SR-TE processing system and the functionality of assisting in creating and maintaining SR-TE policies described herein, may be embodied in various manners. Accordingly, other aspects of the present disclosure relate to systems, computer programs, mechanisms, and means for carrying out the methods according to various embodiments described herein. Such systems, computer programs, mechanisms, and means could be included within various network elements/devices, such as e.g. switches and routers, in particular within edge routers, or BGP speakers (which could be, but do not have to be, included within routers). A computer program may, for example, be downloaded (updated) to the existing network devices and systems (e.g. to the existing routers, switches, various control nodes, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to a data structure for improving processing of routing messages (e.g. update messages) for assisting in creating and maintaining traffic engineering policies. In an embodiment, such a data structure may be included within BGP update messages.

Example Embodiments

For purposes of illustrating the techniques for creating and maintaining traffic engineering policies described herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

The Internet may be viewed as a collection of Autonomous Systems, where an "Autonomous System" (AS) typically refers to a set of network elements, such as e.g. routers, switches, and controllers, under a single technical administration. As described in greater detail below, the term "network element" (also sometimes interchangeably referred to as "network node") may refer to network elements which could include not only actual physical devices and systems but also devices and systems implemented entirely in software and/or could also include virtual devices and systems components. An AS may also be considered to include hosts connected to the network. Segregation into different AS's allows defining administrative authorities and routing policies of different organizations.

Within an AS, network elements communicate with one another by routing packets using an interior gateway protocol (IGP) and by referring to certain common metrics. It may also be possible to use several IGPs, such as e.g. Routing Information Protocol (RIP), Enhanced Interior Gateway Routing Protocol (EIGRP), Open Shortest Path First (OSPF) protocol, interior BGP (iBGP) and Intermediate System-to-Intermediate System (IS-IS) protocol, and sometimes several sets of metrics within an AS.

Externally, neighboring AS's communicate with one another by routing packets using an Exterior Gateway Protocol (EGP), e.g. one Internet standard being exterior BGP (eBGP).

Routers in one AS that are configured to communicate with routers in other AS's, via e.g. eBGP, are referred to as "edge routers", while routers in one AS that are only configured to communicate with other routes in the same AS are referred to as "core routers." For example, the edge routers may be service nodes (e.g. L3VPN, Layer 2 Virtual Private Network (L2VPN) endpoints) that exchange service state via BGP and Label Distribution Protocol (LDP). A pair of edge routers from different AS's configured to communicate with one another are referred to as "EGP neighbors", e.g. "eBGP neighbors."

Each AS is "autonomous" (i.e., relatively independent from the other AS's) in the sense that is runs its own independent routing policies and unique Interior Gateway Protocols (IGPs). Exterior routing protocols were created, the current Internet standard EGP being the Border Gateway Protocol (BGP or eBGP), to exchange routing information between different AS's, a process often referred to as "route advertisement." For example, the BGP defines an inter-AS routing protocol, where one of the primary functions is to exchange network layer reachability information (NLRI) using a so-called "BGP speaking system" (also often referred to as a "BGP speaker") by means of BGP speakers sending so-called "BGP update messages." Thus, the NLRI is exchanged between BGP routers in update messages which are used to send routing updates to peers. NLRI may be viewed as a name of a particular field in a BGP update message, the field typically encoding one or more IP addresses, also referred to as prefixes, IP address prefixes, or destinations. Thus, the NLRI of a BGP update message is a destination field listing, in a form of IP address prefixes, of destination IP addresses of the systems to which the routing information relates. The actual routing information is included in a so-called "path attributes field" of the same BGP update message by listing path attributes, such as ORIGIN, AS_PATH, etc. A BGP update message may include one or more path attributes.

When a BGP session is initialized, update messages are sent until the complete BGP table has been exchanged. Every time an update message is received by a network element, the network element updates its BGP routing table and also typically increments the BGP route table version. Thus, communicating network elements initially exchange their entire BGP routing table, and then send incremental updates on as-needed basis, using update messages.

Turning back to the path attributes of BGP update messages, path attributes may be categorized into four following categories: 1) mandatory attributes, 2) discretionary attributes, 3) optional, transitive attributes, and 4) optional, non-transitive attributes.

The path attributes of the first category must appear in every update message and must be supported by all BGP implementations. If such an attribute is missing from an update message, a notification message is sent to a peer. Such attributes include e.g. AS_PATH, ORIGIN, and NEXT_HOP, as known in the art.

The path attributes of the second category may or may not appear in a BGP update message but must be supported by all BGP implementations. Such attributes include e.g. LOCAL_PREF and ATOMIC_AGGREGATE, as known in the art.

The path attributes of the third category may or may not be supported by all BGP implementations. If it is sent in a BGP update message but not recognized by the receiver, it should be passed on to the next AS. Such attributes include e.g. AGGREGATOR and COMMUNITY, as known in the art.

The path attributes of the fourth category may or may not be supported by all BGP implementations and, if received, it is not required that the router passes it on. Such attributes include e.g. MULTI_EXIT_DISC, ORIGINATOR_ID, and CLUSTER_LIST, as known in the art.

Some embodiments of the present disclosure operate in the context of BGP, where improved SR traffic steering may be ensured by including new information in an NLRI and in at least one path attribute of a BGP update message, and these embodiments are now described. A skilled person will readily recognize, however, that these teachings are equally applicable to other embodiments and to inter-AS protocols other than BGP, all of which, therefore, being within the scope of the present disclosure. Further, unless technically not feasible, the BGP and the BGP update messages describe herein may refer, respectively, to BGPSEC and BGPSEC update messages, where BGPSEC is an extension to the BGP that provides cryptographic assurance to a BGP speaker who receives a valid BGPSEC route advertisement in that the advertised route has the property that every AS on the path of AS's listed in the advertisement has explicitly authorized the advertisement of the route to the subsequent AS in the path.

An exemplary network in which embodiments of the present disclosure may be implemented is illustrated in FIG. 1, providing a simplified block diagram illustrating a data center (DC) network in a network environment 100 according to one embodiment of the present disclosure. The network environment 100 shown in FIG. 1 is merely one example in which embodiments of the present disclosure may be implemented, namely an example of a DFA architecture typically used in DC deployments. A skilled person will readily recognize that teachings provided herein are equally applicable to other DC architectures and to deployments other than DC-centric deployments, such as e.g. in Service Provider (SP) deployments, all of which being within the scope of the present disclosure. Therefore, another network environment in which embodiments of the present disclosure may be implemented is illustrated in FIG. 2 as a network environment 200, illustrating a more general view (i.e. a view detached from the specific implementation of a DFA architecture of FIG. 1) of exemplary network elements which may be involved in creating and maintaining SR-TE policies using BGP in accordance with embodiments of the present disclosure.

Figure 2:
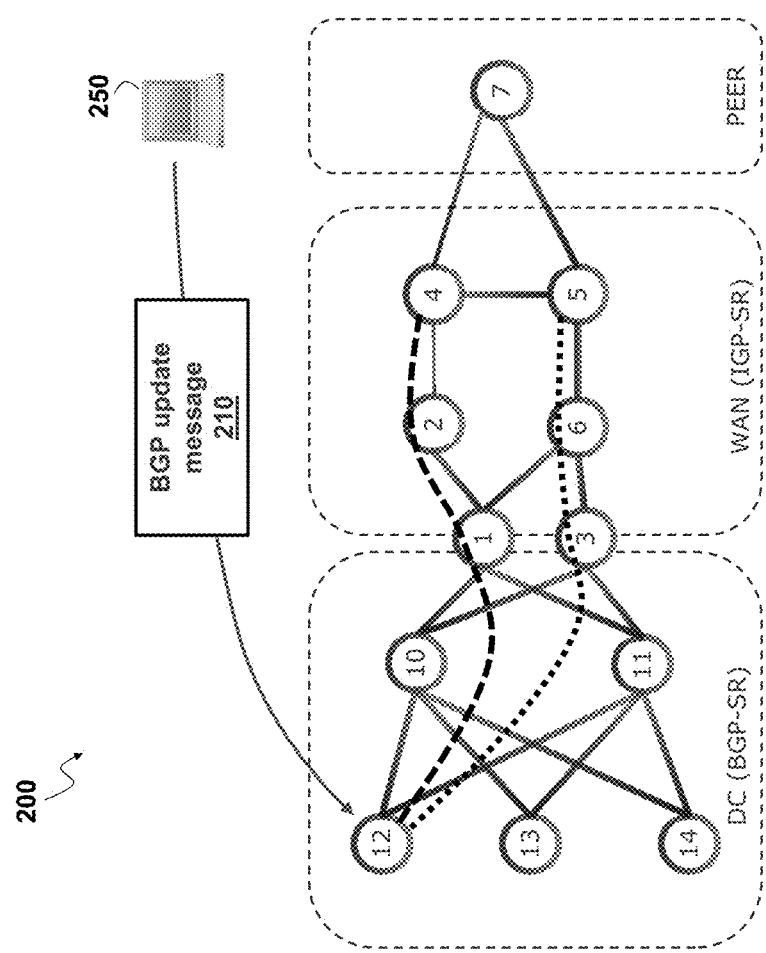
FIG. 2 is a simplified block diagram illustrating an exemplary network environment configured to assist in creating and maintaining SR-TE policies using BGP, according to some embodiments of the present disclosure.

Each of the network environment 100 shown in FIG. 1 and the network environment 200 shown in FIG. 2 represents a series of points or nodes of interconnected communication paths for receiving and transmitting packets of information that propagate through the network environment. The network environment 100/200 offers a communicative interface between nodes (e.g., various network elements within the TOR, etc.), and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in the network environment 100/200. Network elements/nodes of the network environment 100/200 may include any number of hardware or software elements coupled to (and in communication with) each other through a communications medium. Elements of FIGS. 1 and 2 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIGS. 1 and 2 are depicted with communication lines traversing the network environment 100/200.

In the network environment 100/200, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node and a destination node via a network. A packet may include, but is not limited to, a source network address, a destination network address, and a payload containing the information/data to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

As shown in FIG. 1, a typical DC network may include a number of layers shown in FIG. 1 as TOR 120, LEAF 130, and SPINE 140 layers. Each of these layers may include a plurality of network elements/nodes e.g. to provide redundancy. As previously described herein, an architecture such as the one shown in FIG. 1 is referred to as DFA or Vinci architecture.

One or more hosts, each hosting any number of applications, may be connected to the leaf and/or spine nodes of a DC, shown in FIG. 1 as four hosts 110, although it is appreciated that any number of hosts may be present in (i.e. connected to) a DC. In various embodiments, a "host" may be or may include, by way of non-limiting example, any device providing storage, network, or/and computing resource in a data center or any other network environment. Examples of hosts include, but are not limited to, a server, computer, workstation, mainframe, virtual machine (whether emulated or on a "bare-metal" hypervisor), container, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In some embodiments, hosts 110 may include virtual switches and virtual machines ("VMs") that may be created and run on a physical server connected to each leaf node on top of a hypervisor (not shown in the FIGUREs). The virtual switches may be configured to manage communications of VMs in particular virtual networks and/or subnetworks ("subnets") and may be embodied by software stored and executed on the corresponding physical server connected to a leaf node, thus performing functions of a physical switch device. Similarly, the VMs may be software stored and executed on the corresponding physical servers connected to the leaf nodes and configured to exchange communications with other VMs. In other embodiments, the hosts may include containers and bare-metal workload hosts (i.e. workloads that are not running a VM) that preserve their IP address as the application moves the workloads (example include clustered applications such as oracle RAC, etc.).

The TOR 120 is the layer where hosts 110 are connected. Nodes of the LEAF layer 130 connect multiple TOR's inside a pod together. Nodes of the SPINE layer 140 connect group of LEAF layer and multiple pods within a DC. LEAF and SPINE layers may have multiple nodes for bandwidth and redundancy purpose. In some deployments, a host could be multi-homed (i.e. connected to two or more TOR switches for redundancy).

FIG. 1 further illustrates a controller 150. The controller 150 may be provided with, i.e. be or include a BGP SR-TE processing system configured to implement techniques assisting in creating and maintaining SR-TE policies using BGP, as described herein. In some embodiments, the controller 150 may be a Software Defined Network (SDN) controller, where SDN refers to an approach to computer networking that allows network administrators to manage network services through abstraction of lower-level functionality.

The network 100 shown in FIG. 1 is greatly simplified. In practice, there are multiple connections (in many deployments up to 64 connections) between the nodes of the tiers shown (TOR, Leaf and Spine), but, for simplification purposes, only few are shown in FIG. 1. Those skilled in the art will recognize that the number of devices shown and the specific configuration shown in the network 100 is for illustrative purposes and does not limit the present technology. Network environments that include additional and/or different components and connections are contemplated herein and are within the scope of the present disclosure.

FIG. 2 is a simplified block diagram illustrating an exemplary network environment 200 configured to assist in creating and maintaining SR-TE policies using BGP, according to some embodiments of the present disclosure. The example shown in FIG. 2 illustrates a network environment including a plurality of network elements indicated with circles containing reference numerals 1-14. Each one of these network elements could be one or more of the network elements shown in FIG. 1—e.g. the network element 12 could be one of the TOR nodes in the TOR layer 120 shown in FIG. 1. While example of FIG. 2 illustrates exemplary boundaries for a DC, WAN, and PEER, in general, the network elements 1-14 as shown in FIG. 2 could be combined and/or divided into groups in different manners, within each boundary shown in FIG. 2 there may be one or more ASs and some ASs may include network elements shown as encompassed by different boundaries. Besides the network elements 1-14, similar to FIG. 1, FIG. 2 also illustrates, a controller 250 which may be provided with, i.e. be or include a BGP SR-TE processing system configured to implement techniques assisting in creating and maintaining SR-TE policies using BGP, as described herein. In some embodiments, the controller 250 may be a SDN controller.

Similar to the illustration of FIG. 1, the network 200 shown in FIG. 2 is also greatly simplified and is provided as a particular example for illustrative purposes only. In practice, there may be more, less, or/and different connections between the nodes shown where, for simplification purposes, only few are shown in FIG. 2. Those skilled in the art will recognize that the number of devices shown and the specific configuration shown in the network 200 is for illustrative purposes and does not limit the present technology. Network environments that include additional and/or different components and connections than those illustrated in FIG. 2 are contemplated herein and are within the scope of the present disclosure.

The network environment 200 may operate in context of Multiprotocol BGP (MP-BGP), which is an extension of BGP that allows BGP update messages to carry routing information for multiple network layers and address families. Examples of different address families include Internet Protocol version 4 (IPv4), Internet Protocol version 6 (IPv6), L3 VPN for IPv4, L3 VPN for IPv6, multicast VPN for IPv4, multicast VPN for IPv6. For example, MP-BGP can distribute unicast routes used for multicast routing separately from the routes used for unicast IP forwarding. When MP-BGP is configured, BGP installs the MP-BGP routes into different routing tables. Each routing table is identified by the protocol family or address family indicator (AFI) and a subsequent address family identifier (SAFI).

Description below defines a new BGP SAFI with a new NLRI in order to advertise a SR-TE Policy according to various embodiments of the present disclosure. An SR-TE Policy is a set of explicit paths represented by one or more segment lists. The SR-TE Policy may be advertised along with one or more path attributes proposed herein. At least some of the path attributes proposed herein may be Tunnel Encapsulation Attributes as e.g. defined in the Internet Draft "ietf-idr-tunnel-encaps," included herein by reference in its entirety. An SR-TE policy may be advertised with the information that will be used by the node receiving the advertisement in order to instantiate the policy in its forwarding table and to steer traffic according to the policy.

According to some embodiments of the present disclosure, an SR-TE Policy may be defined as a set of equal cost multi path (ECMP) segment lists representing explicit paths. According to other embodiments, an SR-TE Policy may be defined as a set of weighted (i.e. unequal) cost multi path (WCMP) segment lists.

An SR-TE Policy is advertised by a BGP speaker being a router or a controller and using extensions described herein. Among the information encoded in the BGP message and representing the SR-TE Policy, the steering mechanism makes also use of the Extended Color Community currently defined in the Internet Draft "ietf-idr-tunnel-encaps," where color attribute (also referred to simply as "color") is used to differentiate between prefixes/routes based on particular BGP tunnel encapsulation used.

Typically, a controller, e.g. the controller 250, defines the set of policies and advertises them to BGP routers (typically ingress routers). The policy advertisement uses BGP extensions defined herein. The policy advertisement is, in most but not all of the cases, tailored for the receiver. In other words, a policy advertised to a given BGP speaker has significance only for that particular receiving router and is not intended to be propagated anywhere else. Then, the receiver of the policy may instantiate the policy in its routing and forwarding tables and steer traffic into it based on both the policy and destination prefix color and NEXT_HOP.

Alternatively, a router (i.e.: an BGP egress router) advertises SR-TE policies representing paths to itself. These advertisements are sent to BGP ingress nodes who instantiate these policies and steer traffic into them according to the color and endpoint/BGP NEXT_HOP of both the policy and the destination prefix.

An SR-TE policy being intended only for the receiver of the advertisement is sent directly to the designated receiver and, in most of the cases will not traverse any Route Reflector (RR). However, there are cases where a SR-TE Policy may be intended for a group of receivers. Also, in a deployment scenario, a controller may also rely on the standard BGP update propagation scheme which makes use of RRs. Such cases may require mechanisms that uniquely identify each instance of a given policy, and uniquely identify the intended receiver of a given SR-TE Policy advertisement.

According to embodiments of the present disclosure, two types of BGP-based SR-TE may be defined: a dynamic BGP-TE approach and an explicit BGP-TE approach. According to the Dynamic BGP-TE approach, the controller 250 may be configured to specify only the SR-TE policy (e.g., low latency policy, minimum administrative cost policy, a policy specifying proportion of traffic carried over a particular path, etc.), while a different entity, e.g. a head-end entity not specifically shown in FIG. 2, e.g. a Data Center Interconnect (DCI) node, may compute the actual paths (i.e. segment lists) capable of supporting the SR-TE policy specified by the controller. According to the Explicit BGP-TE approach, the controller 250 may specify the SR-TE policy as well as one or more paths associated with the policy.

In the case of explicit BGP-TE, SR-TE paths expressed in the form of IP address(es) and/or SID(s) as described herein are carried over BGP sessions. A BGP session is created with a new AF/SAFI between the controller 250 and each potential head-end node of the respective SR-TE paths. When a SR-TE path is required, the controller 250 determines a suitable path using some methods, as known in the art, and sends the path to the head-end of the path. The head-end builds the corresponding label stack and programs the forwarding plane. As described below, it is possible for the controller 250 to send multiple TE paths in a single BGP message. Also, the controller 250 may be configured to withdraw a previously published SR-TE path from the head-end.

In the case of dynamic BGP-TE, a head-end node may be configured to be responsible for determining a suitable path and passing the corresponding label stack to DC controller over BGP session.

In the following, explanations are provided with reference to the explicit BGP-TE approach, i.e. that the controller 250 specifies the paths associated with a policy, however, it is to be understood that the controller 250 may obtain these paths from the head-end in accordance with the Dynamic BGP-TE approach.

Consider an example where the controller 250 needs to implement and enforce an SR-TE policy and a specific path in accordance with the policy on the network node 12 specifying how the node 12 should forward data to the endpoint node 4. Thus, in this example, the network node 12 is an ingress node (i.e. a node where traffic is injected into the network, e.g. from a server schematically shown in FIG. 2), while the network node 4 is an egress node (i.e. a node where traffic is ejected from the network and provided to a further node, e.g. node 7 shown in FIG. 2 which could e.g. be one of the hosts 110 shown in FIG. 1).

Further consider a simple case where the path to the egress network element 4 that the controller 250 wants to ensure is that from node 1 (node 1 identified e.g. by a prefix 16001) to node 2 (node 2 identified e.g. by a prefix 16002) and then from node 2 to node 4. If there are multiple links between a pair of nodes, then the path may also specify a desired link, e.g. the path may specify that from node 2 to node 4 traffic is to be forwarded via a particular link of a set of links between nodes 2 and 4 (a link identified e.g. as a link 24024). In such a case, the controller 250 would send to the node 12 a BGP update message, shown in FIG. 2 as a BGP update message 210, which would include an NLRI and at least one path attribute. The NLRI would include an identification of a SR-TE policy that dictates the path specified above (e.g. a policy is identified by a certain value, e.g. "green"), an identification of an egress network element to which the node 12 is to forward traffic to (i.e. an identification of the node 4, e.g. an IP address of the node 4). One path attribute of such a BGP update message would reflect the path described above, i.e. it would include a segment list that includes an ordered list of node 1, node 2, and the specified link from node 2 to node 4, e.g. as 16001, 16002, 24024. Such a Segment List attribute may be a mandatory path attribute of the BGP update message 210.

On the receiving BGP speaker, i.e. the node 12 in the scenarios described herein, all destination prefixes that share the same Extended Color Community value and the same BGP NEXT_HOP may be steered to the corresponding SR-TE Policy that has been instantiated on the node and which matches the Color and Endpoint NLRI values.

Similarly, different destination prefixes can be steered into distinct SR-TE Policies by coloring them differently.

The Color field of the NLRI allows association of destination prefixes with a given SR-TE Policy. The controller 250 may be configured to attach a Color Extended Community, as e.g. defined in RFC 5512, to destination prefixes (e.g.: IPv4/IPv6 unicast prefixes) in order to allow the receiver of the SR-TE Policy and of the destination prefix to steer traffic into the SR-TE Policy if the destination prefix has a BGP NEXT_HOP attribute matching the SR-TE Policy SAFI NLRI Endpoint and has an attached Extended Color Community with the same value as the color of the SR-TE Policy NLRI Color.

Typically, but not always, a SR-TE Policy is configured for each individual receiver. In other words, each SR-TE Policy configured is related to the intended receiver. Therefore, a given <color,endpoint> SR-TE Policy may have multiple instances with different content (i.e. different segment lists) where each of these instances (of the same policy) is intended to be sent to different receivers. Therefore, in some embodiments, the NLRI of BGP update messages may include a first field, e.g. a 4-octet value, that encodes information uniquely identifying the policy in the context of <color, endpoint> tuple. In some embodiments, the first field may have no semantic and be solely used by the SR-TE policy originator in order to make unique (from a NLRI perspective) multiple occurrences of the same SR-TE Policy. Thus, each instance of the same SR-TE Policy will have a different value encoded in this NLRI field in order to prevent BGP selection among these instances along the distribution of BGP updates.

In some embodiments, the NLRI of BGP update messages may include a second field, e.g. also a 4-octet value, that encodes information identifying (with the endpoint) the policy. The color is used to match the color of the destination prefixes in order to steer traffic into the SR-TE Policy.

In some embodiments, the NLRI of BGP update messages may include a third field, e.g. an IPv4 (4-octet) address or an IPv6 (16-octet) address according to the AFI of the NLRI, that encodes information identifying the endpoint of a policy. In various embodiments, the endpoint may represent a single node or a set of nodes (e.g.: an anycast address or a summary address).

In various embodiments, the BGP update message 210 may be a BGP update message according to RFC4271 using BGP multiprotocol extensions according to RFC4760 with an AFI of 1 in case of IPv4 or 2 in case of IPv6 and with a SAFI of any suitable codepoint value which may be assigned for the SAFIs discloses herein.

The BGP update message 210 may also carry the BGP mandatory attributes such as e.g. NEXT_HOP, ORIGIN, AS_PATH, and LOCAL_PREF (for IBGP neighbors), as defined in RFC4271. In addition, the BGP update message may also contain any of the BGP optional attributes.

The NEXT_HOP value of the SR-TE Policy SAFI NLRI is set based on the AFI. For example, if the AFI is set to IPv4 (e.g. AFI is 1), then the NEXT_HOP is encoded as a 4-byte IPv4 address. If the AFI is set to IPv6 (e.g. AFI is 2), then the NEXT_HOP is encoded as a 16-byte IPv6 address of the router. A BGP speaker receiving a BGP message with an SR-TE Policy NLRI may be, and typically is, configured to process it only if the NLRI is a best path as per the BGP best path selection algorithm.

The NEXT_HOP value of the SR-TE Policy SAFI NLRI could be set as one of the local addresses of the BGP speaker originating and advertising the SR-TE Policy (either the controller or the BGP egress node).

Upon receipt of such a BGP update message, the node 12 would instantiate the route to endpoint node 4 in its forwarding table and forward data plane traffic that it receives in accordance with the information contained with the message.

Thus, upon receiving a data packet that would identify a destination address in the packet header and an SR-TE policy associated with the packet, node 12 would determine the NEXT_HOP network element associated with the destination address specified in the packet, as known in the art. Node 12 would then determine whether the policy identified in the data packet matches any of the SR-TE policies that the node 12 instantiated and whether the NEXT_HOP network element identified for the received data packet matches the endpoint of one of such policies. Upon positive determination for both the policy and the endpoint, the node 12 would forward the received packet to the endpoint in accordance with the segment list instantiated on the node 12 for this policy and this endpoint. For example, if the destination address in a received data packet is that of the peer node 7 and the SR-TE policy for the received data packet is identified as "green", then the node 12 would determine that the NEXT_HOP element for the destination address of node 7 is node 4, would determine that it has a "green" policy for the endpoint of node 4, would obtain the segment list provided to node 12 earlier in the BGP update message 210 and would forward the data packet from node 1 to node 4 via the segment list specified in that message, i.e. segment list 16001, 16002, 24024.

In some embodiments, a Segment List attribute as described above may appear multiple times in a single SR-TE policy, e.g. when the controller 250 wants to ensure that node 12 can forward traffic to node 4 via two (or more paths). When multiple occurrences of the Segment List attributes appear in a single SR-TE Policy, the traffic may be load-balanced across them either through an ECMP scheme (if no Weight attribute as described below is present) or through a Weighted Cost Multi-Path (WCMP) scheme as e.g. described below. Extending on the case described above, in a further case, consider that the first path is the one of the segment list 16001, 16002, 24024, while a second path could be from node 3 (node 1 identified e.g. by a prefix 16003) to node 6 (node 6 identified e.g. by a prefix 16006) and then from node 6 to node 5 e.g. via a specified link between nodes 6 and 5 (the link identified e.g. as a link 24065), as shown in FIG. 2 with a dotted line from node 12 to node 5. In such a case, the controller 250 could include two different segment lists in the BGP update message 210, included in the path attributes of this update message. The NLRI of such a message would be as described for the example above, while the path attributes would include two segment lists for the policy "green" to the endpoint 4.4.4.4.

It should be noted that it is possible to have a segment list ending somewhere other than the endpoint. The goal is to steer the traffic towards a given destination. The TE path may be end-to-end to the endpoint or may just be up to any intermediate node, as long as, once the TE path exists, the traffic can reach the destination correctly.

Upon receipt of such a BGP update message, the node 12 would instantiate both of the routes to endpoint node 4 in its forwarding table and forward data plane traffic that it receives in accordance with the information contained with the message. The node 12 could implement e.g. load-balancing techniques, or may be configured to take any other considerations into account when deciding which one of the multiple paths to take for forwarding data packets.

In some embodiments when more than one segment lists (i.e. more than one explicit paths) are provided for a given NLRI, the BGP update message 210 may further include a so-called "Weight" value associated with one or more segment lists, indicating proportion of traffic that is to be forwarded via individual segment lists, e.g. when a WCMP load-sharing policy is being implemented. The Weight attribute may be an optional path attribute of the BGP update message 210. When present, the Weight attribute specifies a weight to be associated with the corresponding Segment List, for use in unequal-cost multipath. In some embodiments, Weights may be applied by summing the total value of all of the weights for all Segment Lists, and then assigning a fraction of the forwarded traffic to each Segment List in proportion its weight's fraction of the total. When the SR-TE Policy contains multiple Segment Lists and Weight attributes are not present, then equal cost load balancing is applied amongst them.

In some embodiments, the BGP update message 210 may include an optional path attribute Binding Segment Identifier (binding SID) associated with a given policy, e.g. with policy "green" (the controller 250 may obtain such a binding SID for the path from an external entity, e.g. from a head-end). When the optional Binding SID attribute is present, it indicates an instruction, to the receiving BGP speaker to allocate a Binding SID for the list of SIDs the Binding SID is related to. Any incoming packet with the Binding SID as active segment (e.g. according to the terminology described in Internet-Draft "ietf-spring-segment-routing," included herein in its entirety) may then have the Binding SID swapped with the list of SIDs specified in the Segment List attributes on the allocating BGP speaker. The allocated Binding SID may be then advertised by the BGP speaker that created it in order to, typically, feed a controller with the updated topology and SR-TE Policy information.

In such a case, when a data packet received at node 12 is a data packet encapsulated into a label, the node 12 would first check whether the label of the packet matches any of the binding SIDs that it received BGP update messages on. Upon a positive match, node 12 would identify the segment list associated with a SR-TE policy associated with the binding SID that matched the label of the received packet and forward the data packet according to that segment list. Alternatively, in such a case, when a data packet received at node 12 is an IPv6 data packet with a certain destination address, the node 12 would first determine whether the destination address of the packet matches any of the binding SIDs that it received BGP update messages on. Upon a positive match, node 12 would identify the segment list associated with a SR-TE policy associated with the binding SID that matched the label of the received packet and forward the data packet according to that segment list. In both of these scenarios, the node 12 does not have to check whether the policy and the endpoint of the received data packet match. Thus, using binding SID may be advantageous in terms of processing performed by the node 12 to forward data packets. Furthermore, in both of these scenarios, node 12 may select one segment list out of multiple segment lists for a given binding SID, based e.g. on the considerations described above, e.g. weight path attributes received in BGP update messages as described above, or known load-balancing or other criteria.

To summarize the use of binding SIDs, some embodiments of the present disclosure may use binding SIDs to provide a level of indirection to steer traffic on one or a set of SR-TE path(s). A binding SID is allocated per each {NXET_HOP, color}. In other words, a binding SID represents a set of WCMP or ECMP SR-TE paths.

In the example of the two SR-TE paths described above, ToR node 12 may program its Forwarding Information Base (FIB) as follows:
1. Binding SID (e.g., 40000) is allocated for {NEXT_HOP=node-4, Color=Green}
2. Lookup of the destination prefix from a received data packet returns the binding SID 40000
3. Binding SID 40000 is swapped with the SID stack {16001, 16002, 24024} shown in FIG. 2

Assuming the controller 250 also installs another SR path, e.g. path {16003, 16006, 240065} shown in FIG. 2, with weight 2, the binding SID 40000 is programmed to be swapped to yield the following WCMP SR-TE paths:

{16001, 16002, 24024}, weight=1

{16003, 16006, 24065}, weight=2

According to some embodiments of the present disclosure, another path attribute which may be included within the BGP update message 210 could be a Preference attribute which may be used to determine the preference among multiple SR-TE Policy originators. Such an attribute could be optional, and preferably appears only once in the SR-TE Policy. In some embodiments, the Preference attribute may include one or more fields encoding a value that defines the order of preference of a particular SR-TE policy originator.

The Preference may be used when the same <color, endpoint> policy is advertised by multiple originators of the same SR-TE Policy. The Preference may be used by the receiver, e.g. by the node 12 in the examples described herein, in order to determine which of the received policies are to be installed. One rule that may apply to the Preference is that the Preference is to be applied to the <color,endpoint> tuple. Another rule that may apply to the Preference is that the Preference is used in order to determine which instance of a given SR-TE Policy is to be installed. The behavior of such Preference attribute would be different from the Local Preference BGP attribute. In the context of the SR-TE Policy advertisement, the Preference is used to determine which policy is installed. It does not influence the BGP selection and propagation mechanisms.

In some embodiments, when a BGP speaker receives an SR-TE Policy from a neighbor, it may be configured to determine if the SR-TE Policy advertisement is acceptable. In such embodiments, the receiving BGP speaker may be configured to apply the following considerations: the SR-TE Policy NLRI should have a color value and may have an Endpoint value, at least one attribute should be attached to the BGP update message and include at least one segment list, where the segment list should include at least one segment.

In some embodiments, when a BGP speaker receives an SR-TE Policy from a neighbor, it may be configured to check the validity of the first SID of each Segment List of the SR-TE Policy. The receiving BGP speaker may include the first SID in the receiver local table either as a label (in the case the SID encodes a label value) or as an IPv6 address.

In some embodiments, when a BGP speaker receives an SR-TE Policy from a neighbor, it may be configured to program its MPLS or IPv6 data planes so that BGP destination prefixes matching their Extended Color Community and BGP NEXT_HOP with the SR-TE Policy SAFI NLRI Color and Endpoint are steered into the SR-TE Policy and forwarded accordingly.

On reception of an SR-TE Policy, a BGP speaker is configured to instantiate the SR-TE Policy in its routing and forwarding table with the set of segment lists (i.e.: explicit paths) included in the policy and taking into account the Binding SID and Weight attributes.

In the embodiments where the SR-TE Policies are unique within an SR domain and intended only for the receiver of the SR-TE Policy advertisement, a BGP speaker receiving an SR-TE Policy may be configured to, by default, not propagate such policy, unless specifically instructed to do so.

In some embodiments, the SR-TE Policies as described herein can be carried in context of a Flows pec NLRI, e.g. in accordance with RFC 5575.

Figure 3:
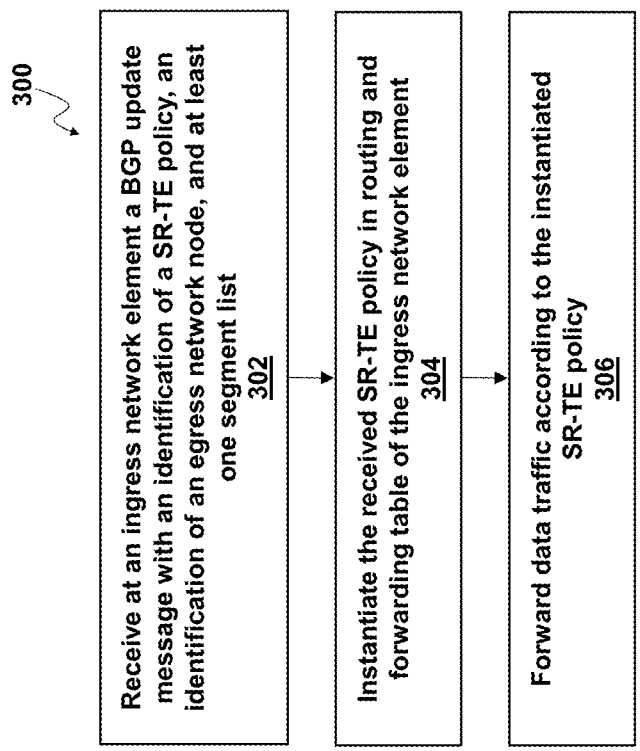
FIG. 3 is a flow diagram of a method for creating and maintaining SR-TE policies using BGP, according to some embodiments of the present disclosure.

FIG. 3 is a flow diagram of a method 300 for creating and maintaining SR-TE policies using BGP, according to some embodiments of the present disclosure. Even though operations of each of the methods are described with reference to the exemplary elements shown in FIG. 2, any system within any network environment configured to perform operations as described herein is within the scope of the present disclosure.

At 302, an ingress network element (e.g. the BGP speaker of the ToR node 12) receives a BGP update message (e.g. the BGP update message 210) with an identification of an SR-TE policy (e.g. "green"), an identification of an endpoint (e.g. "node 4") and at least one segment list (e.g. segment list {16001, 16002, 24024}).

At 304, said ingress network element updates its routing and forwarding table to include information from the received SR-TE policy. Steps 302 and 304 may be carried out several times as multiple policies or policy updates are received as the ingress network element.

At 306, upon receiving data packets, said ingress network element forwards the data packets in accordance with the information on the received SR-TE policies as provided in its routing and forwarding table.

Exemplary Devices

Figure 4:
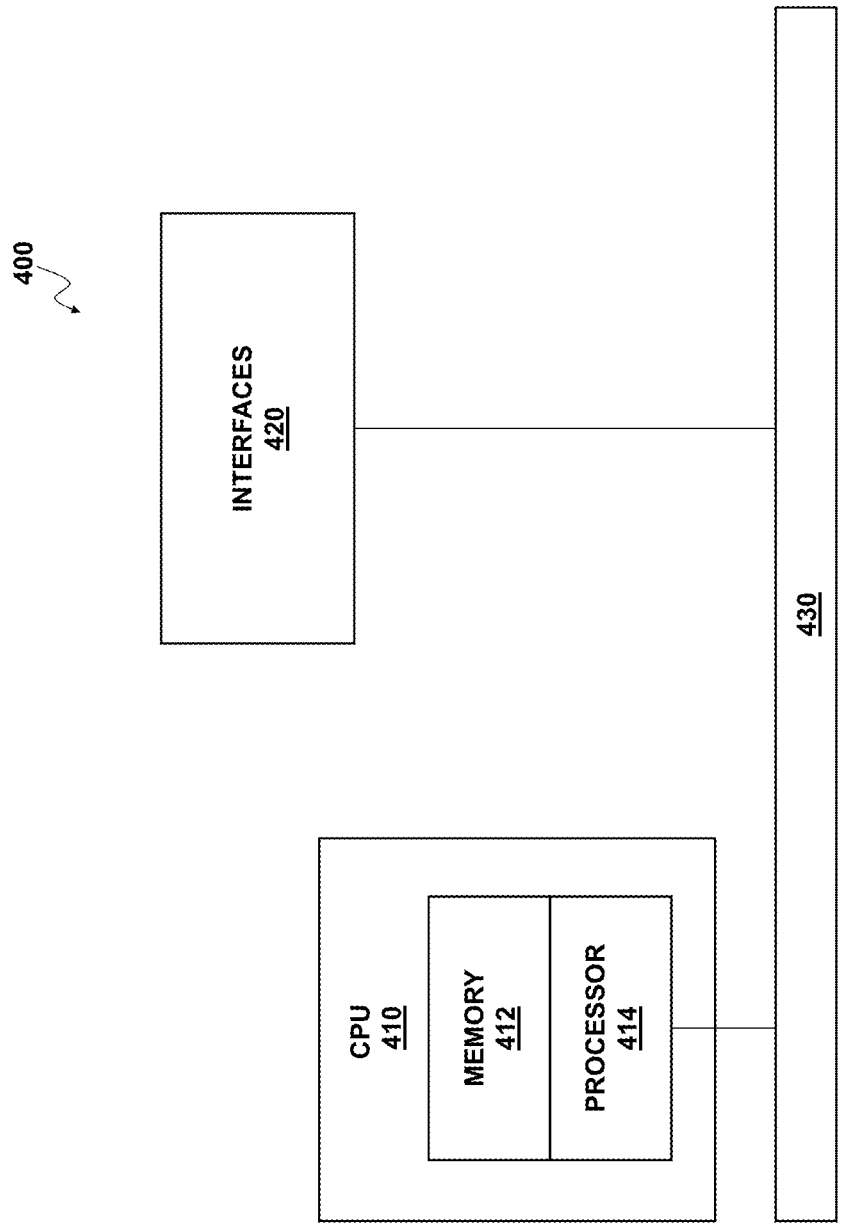
FIG. 4 illustrates an example network device suitable for implementing various embodiments of the present disclosure.

FIG. 4 illustrates an example network device 400 suitable for implementing various embodiments of the present disclosure, e.g. embodiments related to implementing segment routed traffic engineering policies using BGP. In various embodiments, the network device 400 could be any one of network elements described herein, e.g. the network device 400 may be used to implement the functionality of the controller 150/250 or to implement the functionality of various nodes such as e.g. the node 12, shown in FIGS. 1 and 2. In some embodiments, the network device 400 could be communicatively connected to any one of network elements described herein in order to configure any one of these elements to carry out their functionality in assisting creating and maintaining SR-TE policies using BGP as described herein.

As shown in FIG. 4, the network device 400 includes a master central processing unit (CPU) 410, interfaces 420, and a bus 430 (e.g., a PCI bus). When acting under the control of appropriate software or firmware, the CPU 410 may be responsible for executing BGP update message processing, packet management, error detection, and/or routing or forwarding functions. The CPU 410 can accomplish all these functions under the control of software including an operating system and any appropriate applications software. CPU 410 may include one or more processors 414 such as a processor from the Motorola family of microprocessors or the MIPS family of microprocessors. In an alternative embodiment, processor 414 is specially designed hardware for controlling the operations of network device 400. In a specific embodiment, a memory 412 (such as non-volatile RAM and/or ROM) also forms part of CPU 410. However, there are many different ways in which memory could be coupled to the system.

The interfaces 420 are typically provided as interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 410 to efficiently perform routing computations, network diagnostics, security functions, etc.

Although the system shown in FIG. 4 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 412) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5:
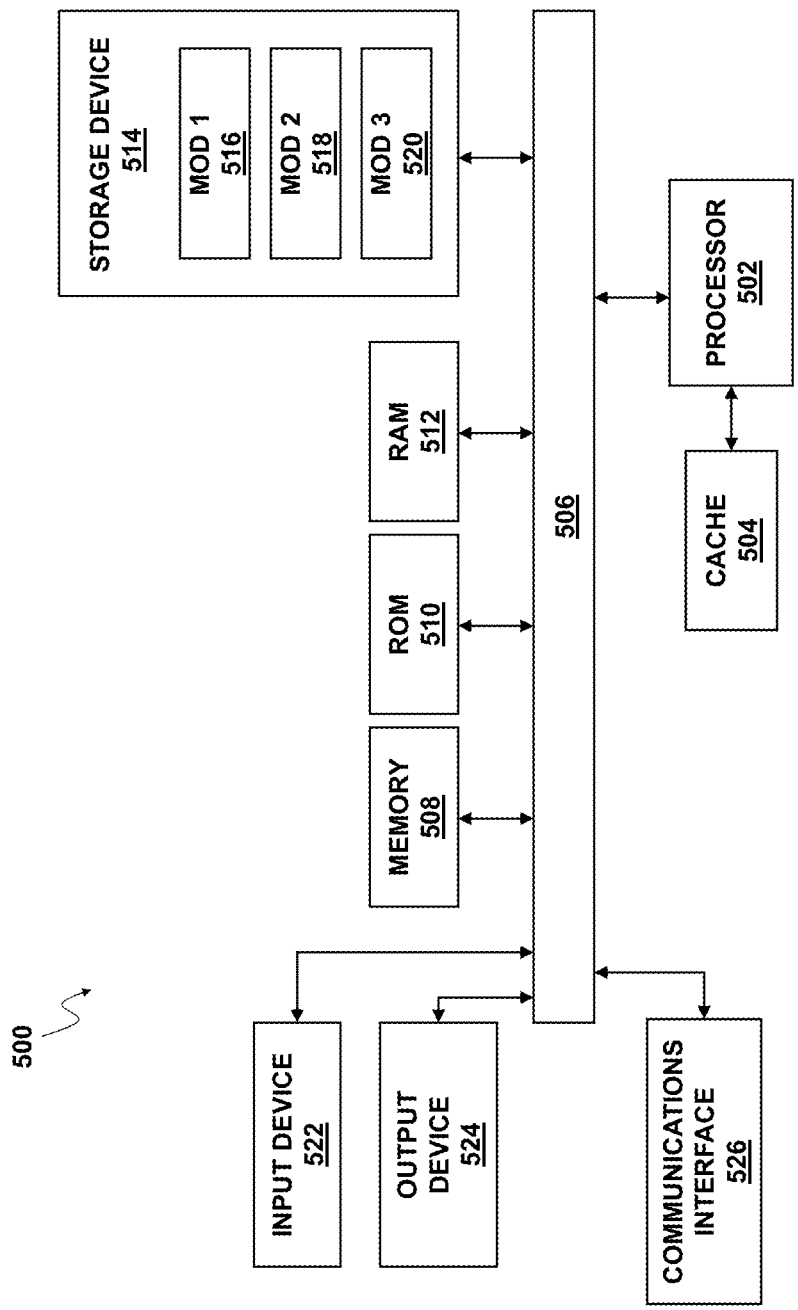
FIGS. 5 and 6 illustrate example systems, according to some embodiments of the present disclosure.
Figure 6:
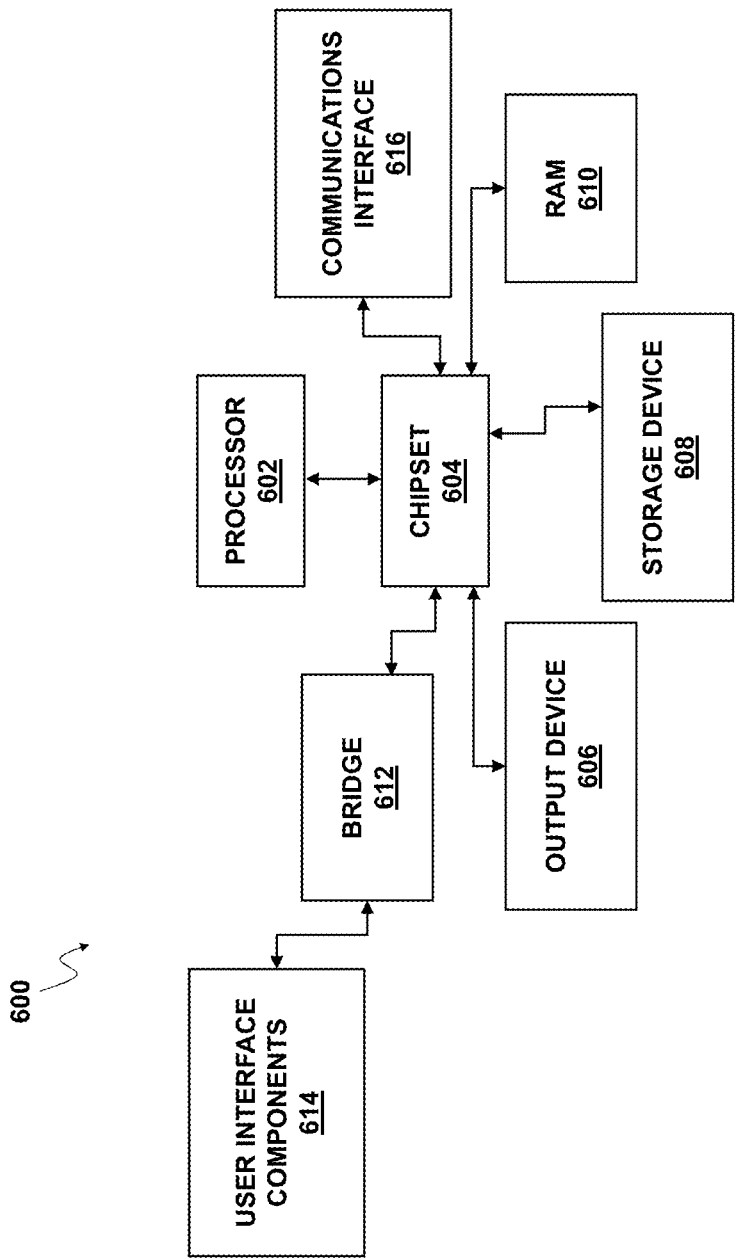

FIGS. 5 and 6 illustrate example systems, according to some embodiments of the present disclosure. The more appropriate embodiment will be apparent to those of ordinary skill in the art when practicing the present technology. Persons of ordinary skill in the art will also readily appreciate that other system embodiments are possible.

Systems such as the ones shown in FIGS. 5 and 6 are also suitable for implementing various embodiments of the present disclosure, e.g. embodiments related to assisting creating and maintaining traffic engineering policies described herein. In various embodiments, such systems could be any one of or could be communicatively connected to in order to configure any one of the network elements described herein to enable functionality of these elements as described above.

FIG. 5 illustrates a conventional system bus computing system architecture 500 wherein the components of the system are in electrical communication with each other. Exemplary system 500 includes a processing unit (CPU or processor) 502, communicatively connected to a system bus 506. The system bus 506 couples various system components to the processor 502, the system components including e.g. a system memory 508, a read only memory (ROM) 510, and a random access memory (RAM) 512. The system 500 can include a cache 504 of high-speed memory connected directly with, in close proximity to, or integrated as part of the processor 502. The system 500 can copy data from the memory 508 and/or the storage device 514 to the cache 504 for quick access by the processor 502. In this way, the cache 504 can provide a performance boost that avoids processor 502 delays while waiting for data. These and other modules can control or be configured to control the processor 502 to perform various actions. Other system memory 508 may be available for use as well. The memory 508 can include multiple different types of memory with different performance characteristics. The processor 502 can include any general purpose processor and a hardware module or software module, such as module 1 516, module 2 518, and module 3 520 stored in the storage device 514, configured to control the processor 502 as well as a special-purpose processor where software instructions are incorporated into the actual processor design. The processor 502 may essentially be a completely self-contained computing system, containing multiple cores or processors, a bus, memory controller, cache, etc. A multi-core processor may be symmetric or asymmetric.

To enable user interaction with the computing device 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing device 500. The communications interface 526 can generally govern and manage the user input and system output. There is no restriction on operating on any particular hardware arrangement and therefore the basic features here may easily be substituted for improved hardware or firmware arrangements as they are developed.

Storage device 514 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 512, read only memory (ROM) 510, and hybrids thereof.

The storage device 514 can include software modules 516, 518, 520 for controlling the processor 502. Other hardware or software modules are contemplated. The storage device 514 can be connected to the system bus 506. In one aspect, a hardware module that performs a particular function can include the software component stored in a computer-readable medium in connection with the necessary hardware components, such as the processor 502, bus 506, display 524, and so forth, to carry out the function.

FIG. 6 illustrates an example computer system 600 having a chipset architecture that can be used in executing the described method and generating and displaying a graphical user interface (GUI). Computer system 600 is an example of computer hardware, software, and firmware that can be used to implement the disclosed technology. System 600 can include a processor 602, representative of any number of physically and/or logically distinct resources capable of executing software, firmware, and hardware configured to perform identified computations. Processor 602 can communicate with a chipset 604 that can control input to and output from processor 602. In this example, chipset 604 outputs information to output 606, such as a display, and can read and write information to storage device 608, which can include magnetic media, and solid state media, for example. Chipset 604 can also read data from and write data to RAM 610. A bridge 612 for interfacing with a variety of user interface components 614 can be provided for interfacing with chipset 604. Such user interface components 614 can include a keyboard, a microphone, touch detection and processing circuitry, a pointing device, such as a mouse, and so on. In general, inputs to system 600 can come from any of a variety of sources, machine generated and/or human generated.

Chipset 604 can also interface with one or more communication interfaces 616 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 602 analyzing data stored in storage 608 or 610. Further, the machine can receive inputs from a user via user interface components 614 and execute appropriate functions, such as browsing functions by interpreting these inputs using processor 602.

It can be appreciated that example systems 500 and 600 can have more than one processor 502, 602, or be part of a group or cluster of computing devices networked together to provide greater processing capability.

Variations and Implementations

It should be noted that much of the infrastructure discussed herein can be provisioned as a part of any type of network element. As used herein, the term "network element" (also sometimes referred to, interchangeably, as a "network node", "node", or "network device") can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for controlling steering of traffic in a network comprising multiple network elements according to Segment Routed Traffic Engineering (SR-TE) policies, the method comprising:
   receiving, at an ingress network element, a Border Gateway Protocol (BGP) update message comprising network reachability information (NLRI) and one or more path attributes to a network element, wherein
      the NLRI comprises an identification of a SR-TE policy and an identification of an egress network element to which the traffic is to be provided to, and
      the one or more path attributes comprise:
         a first segment list comprising a first ordered list of one or more network elements that the traffic associated with the identified SR-TE policy is to traverse to reach the identified egress network element;
         a second segment list comprising a second ordered list of one or more network elements that the traffic associated with the identified SR-TE policy is to traverse to reach an intermediate network element between the ingress network element and the identified egress network element;
         a first weight associated with the first segment list and a second weight associated with the second segment list; and
   forwarding traffic received at the ingress network element in accordance with the received BGP updated message.

2. The method according to claim 1, wherein said forwarding comprises:
   receiving, at the ingress network element, a data packet identifying a destination address;
   determining a NEXT_HOP network element and a color attribute associated with the destination address;
   determining whether the color attribute matches a color attribute of the SR-TE policy of the BGP update message and whether the NEXT_HOP network element associated with the destination address of the data packet matches the egress network element identified in the NLRI of the BGP update message; and
   upon positive determination that the color attribute associated with the destination address matches the color attribute of the SR-TE policy of the BGP update message and that the NEXT_HOP network element associated with the destination address of the data packet matches the egress network element identified in the NLRI of the BGP update message, forwarding the data packet according to the first segment list or the second segment list based on the first weight and the second weight.

3. The method according to claim 1, wherein the one or more path attributes further comprise a binding segment identifier (SID) associated with the SR-TE policy.

4. The method according to claim 3, wherein said forwarding comprises:
   receiving, at the ingress network element, a data packet encapsulated into a label;
   determining whether the label matches the binding SID; and
   upon positive determination that the label matches the binding SID,
      identifying the first segment list and the second segment list that are associated with the SR-TE policy associated with the binding SID that matched the label of the received data packet, and
      forwarding the data packet according to the first segment list or the second segment list based on the first weight and the second weight.

5. The method according to claim 4, wherein the forwarding is performed without determining whether a policy identified in the data packet matches the SR-TE policy of the BGP update message and without determining whether a NEXT_HOP network element associated with a destination address of the packet matches the egress network element identified in the NLRI of the BGP update message.

6. The method according to claim 3, wherein said forwarding comprises:
   receiving, at the ingress network element, an Internet Protocol version 6 (IPv6) data packet identifying a destination address;
   determining whether the destination address of the data packet matches the binding SID provided in the one or more path attributes of the BGP update message; and
   upon positive determination that the destination address of the data packet matches the binding SID provided in the one or more path attributes of the BGP update message, forwarding the data packet according to the first segment list or the second segment list based on the first weight and the second weight of the BGP update message that included the binding SID that matched the destination address of the received data packet.

7. The method according to claim 6, wherein the forwarding is performed without determining whether a policy identified in the data packet matches the SR-TE policy of the BGP update message and without determining whether a NEXT_HOP network element associated with the destination address of the packet matches the egress network element identified in the NLRI of the BGP update message.

8. The method according to claim 1, wherein said forwarding comprises:
receiving, at the ingress network element, a data packet identifying a policy and a destination address;
determining a NEXT_HOP network element associated with the destination address;
determining whether the policy identified in the data packet matches the SR-TE policy of
the BGP update message and whether the NEXT_HOP network element associated with the destination address of the data packet matches the egress network element identified in the NLRI of the BGP update message; and
upon positive determination that the policy identified in the data packet matches the SR-TE policy of the BGP update message and that the NEXT_HOP network element associated with the destination address of the packet matches the egress network element identified in the NLRI of the BGP update message, forwarding the data packet according to the first segment list or the second segment list based on the first weight and the second weight.

9. The method according to claim 8, wherein, when the first weight is equal to the second weight, said forwarding comprises, upon positive determination that the policy identified in the data packet matches the SR-TE policy of the BGP update message and that the NEXT_HOP network element associated with the destination address of the packet matches the egress network element identified in the NLRI of the BGP update message,—forwarding the data packet according to either the first segment list or the second segment list in accordance with one or more load balancing or/and one or more predefined criteria.

10. The method according to claim 1, wherein:
the BGP update message is a first BGP update message, and
the one or more path attributes of first BGP update message further comprise a first preference value,
the method further includes receiving, at the ingress network element, a second BGP update message comprising an identification of the SR-TE policy identified in the first BGP update message, an identification of the egress network element identified in the first BGP update message, and one or more path attributes comprising a third segment list comprising a third ordered list of one or more network elements that the traffic associated with the identified SR-TE policy is to traverse to reach the identified egress network element, and
the one or more path attributes of second BGP update message further comprise a second preference value.

11. The method according to claim 10, wherein said forwarding comprises:
receiving, at the ingress network element, a data packet identifying a policy and a destination address;
determining a NEXT_HOP network element associated with the destination address; determining that the policy identified in the data packet matches the SR-TE policy of both the first and the second BGP update messages and that the NEXT_HOP network element associated with the destination address of the data packet matches the egress network element identified by both the first and the second BGP update messages;
using the first preference value and the second preference value to determine whether the first or the second BGP update message takes precedence; and
forwarding the data packet according to the first segment list or the second segment list based on the first weight and the second weight when the first BGP update message is determined to take precedence over the second BGP update message and forwarding the data packet according to the third segment list when the second BGP update message is determined to take precedence over the first BGP update message.

12. The method according to claim 1, further comprising:
determining, by the ingress network element, whether the BGP update message is acceptable based on whether the SR-TE policy of the BGP update message comprises a color attribute, whether the one or more path attributes comprises at least one segment list, and whether the segment list comprises at least one segment.

13. A system for controlling steering of traffic in a network comprising multiple network elements according to Segment Routed Traffic Engineering (SR-TE) policies, the system comprising:
at least one memory element configured to store computer executable instructions, and
at least one processor coupled to the at least one memory element and configured, when executing the instructions, to:
receive, at an ingress network element, a Border Gateway Protocol (BGP) update message comprising network reachability information (NLRI) and one or more path attributes to a network element, wherein the NLRI comprises an identification of a SR-TE policy and an identification of an egress network element to which the traffic is to be provided to, and the one or more path attributes comprise:
a first segment list comprising a first ordered list of one or more network elements that the traffic associated with the identified SR-TE policy is to traverse to reach the identified egress network element;
a second segment list comprising a second ordered list of one or more network elements that the traffic associated with the identified SR-TE policy is to traverse to reach an intermediate network element between the ingress network element and the identified egress network element; and
a first weight associated with the first segment list and a second weight associated with the second segment list; and
forward traffic received at the ingress network element in accordance with the received BGP updated message.

14. The system according to claim 13, wherein the at least one processor is further configured to instantiate the SR-TE policy and information received in the BGP update message related to the SR-TE policy in a routing and forwarding table of the system.

15. The system according to claim 13, wherein the one or more path attributes further comprise a binding segment identifier (SID) associated with the SR-TE policy.

16. One or more non-transitory computer readable storage media encoded with software comprising computer executable instructions controlling steering of traffic in a network comprising multiple network elements according to Segment Routed Traffic Engineering (SR-TE) policies and, when the software is executed, configured to:
receive, at an ingress network element, a Border Gateway Protocol (BGP) update message comprising network reachability information (NLRI) and one or more path attributes to a network element, wherein the NLRI comprises an identification of a SR-TE policy and an identification of an egress network element to which the traffic is to be provided to, and the one or more path attributes comprise:

a first segment list comprising a first ordered list of one or more network elements that the traffic associated with the identified SR-TE policy is to traverse to reach the identified egress network element;

a second segment list comprising a second ordered list of one or more network elements that the traffic associated with the identified SR-TE policy is to traverse to reach an intermediate network element between the ingress network element and the identified egress network element;

a first weight associated with the first segment list and a second weight associated with the second segment list; and forward traffic received at the ingress network element in accordance with the received BGP updated message.

17. The one or more non-transitory computer readable storage media according to claim 16, wherein the computer executable instructions are further operable to instantiate the SR-TE policy and information received in the BGP update message related to the SR-TE policy in a routing and forwarding table.

18. The one or more non-transitory computer readable storage media according to claim 16, wherein said forwarding comprises: receiving, at the ingress network element, a data packet identifying a destination address; determining a NEXTHOP network element and a color attribute associated with the destination address; determining whether the color attribute matches the SR-TE policy of the BGP update message and whether the NEXT HOP network element associated with the destination address of the data packet matches the egress network element identified in the NLRI of the BGP update message; and upon positive determination that the color attribute matches the color attribute of the SR-TE policy of the BGP update message and that the NEXT HOP network element associated with the destination address of the data packet matches the egress network element identified in the NLRI of the BGP update message, forwarding the data packet according to the first segment list or the second segment list based on the first weight and the second weight.

19. The one or more non-transitory computer readable storage media according to claim 16, wherein the one or more path attributes further comprise a binding segment identifier (SID) associated with the SR-TE policy.

20. The one or more non-transitory computer readable storage media according to claim 19, wherein said forwarding comprises:

receiving, at the ingress network element, a data packet encapsulated into a label; determining whether the label matches the binding SID; and upon positive determination that the label matches the binding SID, identifying the first segment list and the second segment list that are associated with the SR-TE policy associated with the binding SID that matched the label of the received data packet, and forwarding the data packet according to the first segment list or the second segment list based on the first weight and the second weight.

* * * * *

UNITED STATES PATENT AND TRADEMARK OFFICE
CERTIFICATE OF CORRECTION

PATENT NO. : 10,454,821 B2  
APPLICATION NO. : 15/419819  
DATED : October 22, 2019  
INVENTOR(S) : Clarence Filsfils et al.

Page 1 of 1

It is certified that error appears in the above-identified patent and that said Letters Patent is hereby corrected as shown below:

In the Claims

Claim 9, Column 21, Line 31, please replace "message,--forwarding" with --message, forwarding--

Claim 18, Column 23, Line 32, please replace "NEXTHOP" with --NEXT_HOP--  
Claim 18, Column 24, Line 3, please replace "NEXT HOP" with --NEXT_HOP--  
Claim 18, Column 24, Line 9, please replace "NEXT HOP" with --NEXT_HOP--

Signed and Sealed this  
Tenth Day of December, 2019

Andrei Iancu  
*Director of the United States Patent and Trademark Office*